Dec. 3, 1940.  H. W. JONES ET AL  2,223,451
APPARATUS FOR REMOVING SURFACE METAL FROM METALLIC BODIES
Filed June 27, 1934  5 Sheets-Sheet 1

INVENTORS
HOMER W. JONES
EDMUND A. DOYLE
BY
Greenewald
ATTORNEY

Dec. 3, 1940. H. W. JONES ET AL 2,223,451
APPARATUS FOR REMOVING SURFACE METAL FROM METALLIC BODIES
Filed June 27, 1934  5 Sheets-Sheet 2

Fig 3

INVENTORS
HOMER W. JONES
EDMUND A. DOYLE
BY
ATTORNEY

Patented Dec. 3, 1940

2,223,451

UNITED STATES PATENT OFFICE 2,223,451

APPARATUS FOR REMOVING SURFACE METAL FROM METALLIC BODIES

Homer W. Jones, Elizabeth, N. J., and Edmund A. Doyle, Brooklyn, N. Y., assignors, by mesne assignments, to Union Carbide and Carbon Corporation, a corporation of New York Application June 27, 1934, Serial No. 732,668

28 Claims. (Cl. 266—23)

This invention relates to apparatus for surfacing or removing metal from the surfaces of metallic bodies.

In many industrial applications it is desirable to provide apparatus which will economically and efficiently remove surface metal from metallic bodies. One such industrial application is found in steel mill operations in the manufacturing of steel billets, bars, slabs, and other semi-finished shapes. In the manufacturing of these semi-finished shapes, surface defects, such as cracks or seams, are often produced. These surface defects are usually removed, and thereafter the semi-finished shapes are subjected to further rolling.

Within the last few years blowpipes having nozzles particularly adaptable for removing surface metal from metallic bodies have been employed. These nozzles are constructed so as to deliver a comparatively large volume of oxidizing gas at a relatively low velocity in such a manner that surface metal is removed and cuts or grooves are produced having gradually sloping sides. By making cuts in this manner, the sloping sides of the cuts will tend to flatten out and will not fold over and be rolled into the metallic body upon further rolling thereof. Either one or a plurality of these nozzles have been employed in apparatus in which the nozzle or nozzles are moved relatively to the metallic body.

The principal objects of this invention are to provide an improved apparatus for economically and efficiently removing metal from the surfaces of billets, blooms, and other metallic bodies by means of gaseous heating and oxidizing streams; to provide mechanism whereby such streams may be accurately and conveniently adjusted with respect to a metallic body from which surface metal is to be removed, whereby such streams may be propelled along the surface to be removed, and whereby the entire mechanism is readily controllable by a single operator; to provide means whereby the tips of blowpipe nozzles employed to produce the gaseous heating and oxidizing streams are protected from excessive wear during their movement along the surface of the metallic body; and to provide mechanism for guiding the blowpipe nozzles as they are propelled along the surface of the metallic body.

These and other objects and the advantages of this invention will become apparent from the following description and the accompanying drawings, in which.

Apparatus embodying this invention comprises means for progressively delivering a stream of oxidizing gas obliquely against and lengthwise of a lateral surface of a metal body, such as a steel billet, to remove a layer of metal from said surface. The oxidizing gas delivering means may consist of one or more torches or blowpipes including nozzles N and associated heads H. These nozzles N and heads H may be supported by or suspended from a frame which constitutes a carriage E that is movable along a pair of rails T'. The rails T' may constitute part of a base frame C that is arranged to be propelled along suitable guiding means, such as a pair of main rails T, which are horizontal and preferably elevated when the metallic body operated upon is disposed in a horizontal position on supporting means, such as bars or beams F. The frame C may be provided with a platform P for carrying an operator during operation of the apparatus.

To remove surface metal it must be raised to the ignition or kindling temperature at which it reacts with oxygen before the oxidizing gas is applied thereto. The entire metallic body may be raised to such ignition temperature, as in a furnace, or successive portions of the surface metal may be progressively raised to an ignition temperature prior to the application of the oxidizing gas stream, as by the blowpipe nozzles N. The blowpipe nozzles N may comprise a central passage for an oxidizing gas to provide an oxidizing gas stream. A plurality of passages surrounding the central passage may be provided for a combustible gas to produce a heating flame to raise the metal to be removed to an ignition temperature. Such nozzles produce a relatively voluminous oxygen stream having a velocity of flow and character particularly adapted for efficiently removing surface metal.

The number of nozzles N employed will depend, of course, upon the area of surface metal to be removed. As shown in the drawings, particularly Figs. 3, 4 and 6, a plurality or gang of nozzles N are arranged adjacent to each other and at an acute angle to the surface of the body B for removing metal from the entire top surface in a single pass. The nozzles N are secured to nozzle heads H having an oxidizing gas passage and a combustible gas passage communicating with similar passages in the nozzle N. The oxidizing gas, such as oxygen or a mixture of oxygen and air, and a combustible gas, such as a mixture of oxygen and acetylene, may be delivered to the heads H through conduits, indicated at 10 in Fig. 4, from suitable sources of supply (not shown). The nozzle heads H may be water-cooled, if desired, and for this purpose connections are provided at 10 to which may be connected conduits for circulating cooling water through the heads H. Each nozzle head H is preferably constructed as a single independent unit which may be fixedly secured at 11 at the lower and upper ends thereof, as shown in Fig. 4, to a vertically extending member 11'.

In removing or cutting metal, it may be desirable under certain conditions to permit the tips of the nozzles N to ride as closely as possible to the bottom of the cut. It is preferable, however, not to allow the nozzles to contact the work as this causes rapid and excessive wear of the tips of the nozzles N. For this reason shoes or members 12 are secured to the bottom of each vertically extending member 11, which shoes project forward in the direction of a cutting operation and at a slight angle downward toward the work. The end of each shoe 12 is spaced from the tip of a nozzle N and coated on the lower side thereof at 13 with metal having a relatively high hardness. We prefer to employ a metal alloy composed of chromium, cobalt, and tungsten, and having a relatively high amount of carbon, such an alloy being capable of maintaining its hardness at red heat. The tips 13 tend to ride in the grooves or cuts produced by the nozzles N, and may be so arranged that the tips of the nozzles N will be disposed close to the surface of the work and out of contact therewith.

Independent angular adjustment for each of the nozzles N is provided by pivotally connecting the vertically extending members 11' at 14 at the upper and lower ends thereof to vertically extending members or bars 15. After each nozzle N is positioned at the desired angle in a vertical plane, the connections at 14 may be tightened.

It is not desirable to allow the entire weight of the nozzles N and heads H to rest on the tips 13. Therefore each nozzle head H and the vertically extending members 11' and 15 cooperating therewith are counterbalanced to some extent. As shown most clearly in Figs. 3 and 4, the counterbalancing mechanism may comprise links 16 and 17 having one of their ends pivotally connected at 18 and 19, respectively, to the upper and lower ends of vertically extending members 15. The opposite ends of the upper links 16 are pivotally mounted on a pin 20, and the opposite ends of the lower links 17 are pivotally mounted on a pin 21. The pins 20 and 21 are journaled in openings in the side walls 22 of a vertically extending U-shaped channel member or carrier M. With this construction each nozzle head H and its cooperating structure is independently movable as a unit through a limited parallel motion in a vertical direction by reason of its connection to channel member M through a pair of links 16 and 17, and each such unit may be supported by a tension spring 23 having one end thereof secured to the upper end of the channel member M, and the lower end thereof secured to a bracket 24 which may be formed integral with the upper end of the vertically extending member 15.

To prevent the nozzle heads H from dropping a considerable distance after the nozzles N have moved off the surface of the work and to insure a quick return movement of the nozzle heads to the starting position, the lowest position the nozzle heads H can assume may be fixed by providing a rod 26 which extends between the side walls 22 of the channel member or carrier M. This rod 26 is adapted to contact the lower links 17 and limits the downward movement of the nozzle heads H and nozzles N.

Figure 8:
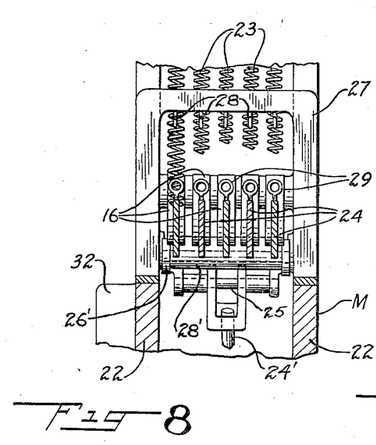
Fig. 8 is a sectional view taken on line 8—8 of Fig. 4, illustrating a detail of the blowpipe supporting structure.

Each nozzle head and its cooperating structure is arranged to be maintained out of a normal operating position for any particular metal surfacing operation. This may be accomplished by providing an upwardly extending rectangular open frame 27, as shown in Figs. 4 and 8, which is attached to the side walls 22 of the channel member M. A plurality of depending pivotally connected hooks 28 are provided in spaced relation at the upper cross member of the frame 27, these hooks being adapted to cooperate with eyebolts 29 secured to the brackets 24 at the upper ends of the vertically extending members 15.

Figure 10:
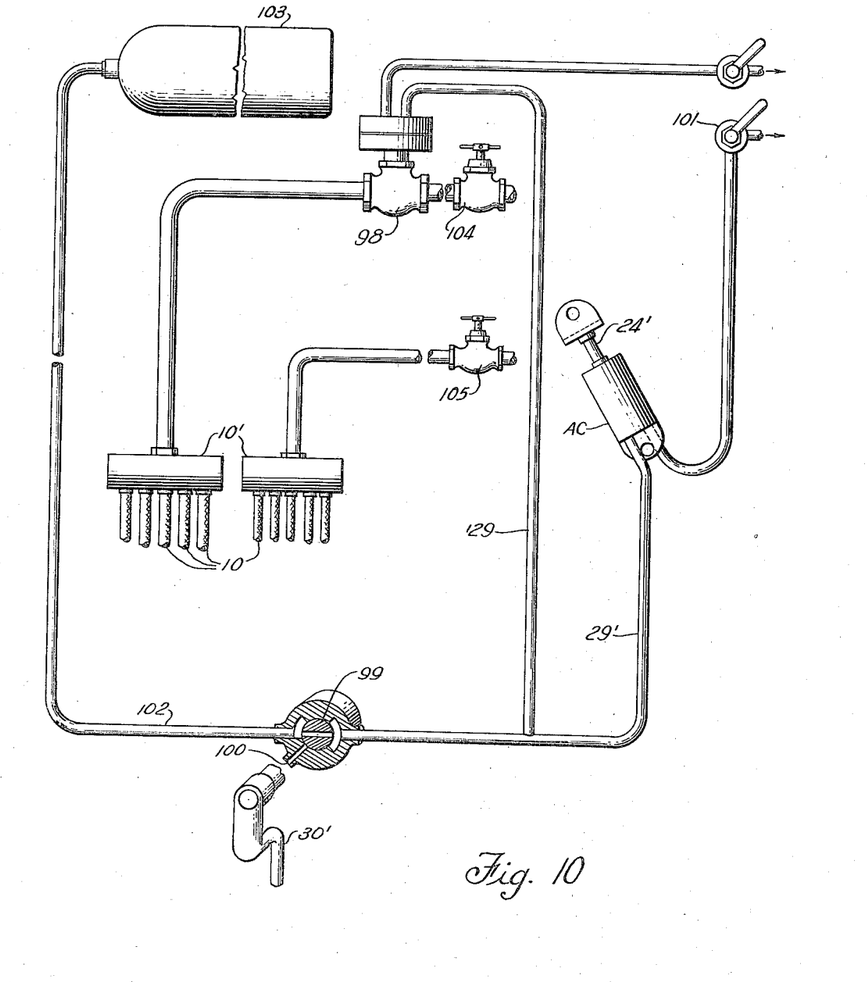
Fig. 10 is a fragmentary view, partly in section and partly in elevation, showing details of valve connections used in a modified form of the invention.

It is desirable to provide mechanism for raising and lowering the nozzles N and shoes 12 so that they can be maintained above and clear of the top surface of the metallic body. The raising and lowering of the nozzles N and tips 13 may be accomplished by power means, for example, pneumatically by an air cylinder AC pivotally connected at one end thereof at 23' to the rear wall of the U-shaped member M. A movable piston within the cylinder AC may be connected to a piston rod 24' extending upwardly and having the upper end thereof pivotally connected at 25' to the center of a broad link 26' extending between the side walls of the member M. This link 26' is pivotally connected at 27' at one end thereof to the rear wall of the member M, and a roller 28' is provided at the opposite end thereof. When the piston rod 24' is in its lower position, the roller 28' is spaced from the upper links 16 and permits the tips 13 to contact the surface of the metallic body. When air is admitted under pressure at 29' into the cylinder AC, the piston rod 24' and link 26' are caused to move upwardly so that the rollers 28' will contact the upper links 16 and raise the vertical members 15 and structure supported thereby. The lowering of the vertical members 15 and nozzles N and shoes 12 may be effected by gravity by means of a hand valve 101 shown in Fig. 10, which will release the compressed air in the cylinder AC into the atmosphere. This raising and lowering of the nozzles N and shoes 12 may also be effected, if desired, by a trigger valve 99 having a handle 30' pivotally connected to the bottom of one of the vertical members 11. The valve 99 may be arranged to admit compressed air into the cylinder AC when the handle 30' is in a vertical position, as indicated in dotted lines in Fig. 4; and may be arranged to release the compressed air in cylinder AC to the atmosphere through a port 100 when handle 30' is in an inclined position with the end thereof contacting the surface of the metallic body, as shown in solid lines in Fig. 4.

The blowpipe carrier member M may be pivotally mounted at 30 at the upper and lower ends thereof to a vertically extending member G. The pivotal connections 30 are preferably such that the member M and the structure supported thereby can be angularly moved about an axis directly behind one of the side walls 22 of the member M. The member M may be positioned parallel to the direction of movement of the nozzles N with respect to the work or at an acute angle thereto in both directions. As shown in Fig. 4, such means may comprise a threaded stud 31 extending through a threaded opening in a flanged portion 32 of the member M, the end of the stud limiting the angular movement of the member M toward the vertically extending member G. A second threaded stud 33 disposed above the stud 31 is pivotally connected at 34 to the member G, extends through an opening in the flange 32, and is adapted to receive a nut 35 which may be adjusted to limit the angular movement of the member M away from the member G.

Figure 6:
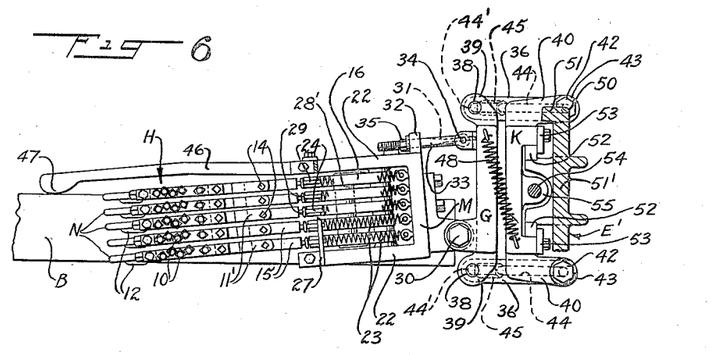
Fig. 6 is a sectional view taken on line 6—6 of Fig. 4 and enlarged to illustrate the details of the structure supported by the transversely movable carriage for maintaining the blowpipe nozzles at a desired position with respect to a metallic body during a metal removing operation.
Figure 7:
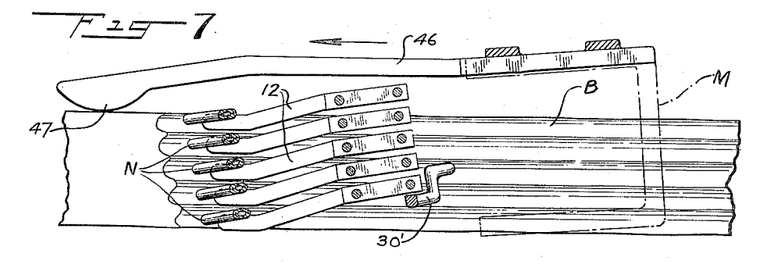
Fig. 7 is a view taken on line 7—7 of Fig. 4, illustrating the blowpipe nozzle protecting members.

The entire structure thus far described, including the members G, M, 15, 11, nozzle heads H, and nozzles N, is supported so that the structure is movable transversely to the direction of movement of the nozzles N with respect to the work during a cutting operation. During such transverse or lateral movement it is highly desirable to maintain the nozzles N in their adjusted position. This may be accomplished by connecting the vertically extending member G through parallel linkage to vertically extending frame member K. Referring to Figures 4 and 6, the parallel linkage may comprise a pair of upper links 36 arranged in the same horizontal plane on each side of the members G and K, and a second similarly arranged pair of lower links 37 below and in the same vertical plane as the links 36. One end of each link 36 is secured to a vertical pin 38 pivotally mounted on spaced brackets 39 which may be formed integral with the member G. Similarly, one end of each link 37 is secured to a vertical pin 38' pivotally mounted on spaced brackets 40 which may be formed integral with the member K.

To provide adequate support for the member G and the parts supported thereby, while at the same time insuring a free transverse movement of the member G through the parallel linkage, the opposite ends of the links 36 and 37 are preferably journaled in thrust bearings. Referring to Figure 5, one end of each of the links 36 may be fixedly secured by a set screw 36' to a vertical pin 41 mounted in spaced brackets 40. The upper ends of the pins 41 are recessed and threaded to receive threaded studs 42 which maintain the upper and lower races of ball bearings 43 in position. The lower ends of the pins 41 are also recessed and threaded to receive the upper threaded ends of truss bars 44 which extend downward and diagonally toward the member G, as shown in Figure 4. The threaded lower ends of the truss bars 44 are connected to turnbuckles 45 which also receive truss bars 44' extending upwardly from the pivotal mounting of one end of the lower links 37. These pivotal mountings are similar to those just described with the thrust bearing being disposed below the spaced brackets 39 on the member G. A rigid support is thus provided for the member G and the parts attached thereto, and any tendency of distortion or bending of the links 36 and 37 is avoided.

In many instances the side surfaces of a metallic body from the top surface of which surface metal is to be removed are not perfectly straight. To insure complete removal of all surface metal in a single pass, means for guiding the nozzles transversely to the longitudinal dimension of a body is provided. Referring to Fig. 4, such means may comprise an arm 46 which is secured to the bottom of one of the side walls 22 of the channel member M, extends in the direction of the nozzles N, and terminates below the nozzles and at one side thereof. The outer end of the arm 46 may be provided with a shoe or tip 47 composed of the same metal alloy that is employed in the tips 13, which shoe 47 is adapted to bear against a side surface of the metallic body. The nozzles N are maintained positioned with respect to the side of the metallic body, regardless of any irregularities in the surface of such side, by the arm 46, which is biased towards the side by a tension spring 48 having one end thereof connected to the member G and the opposite end thereof connected to the member K.

The structure including the nozzles N, nozzle heads H, vertical members 11 and 15, and members M, G, and K, may be termed a blowpipe unit S. This blowpipe unit S is adapted to be carried by a carriage E, hereinafter to be described, and is preferably adjustable vertically thereon so that it may be positioned at any desired elevation for a cutting operation.

Figure 3:
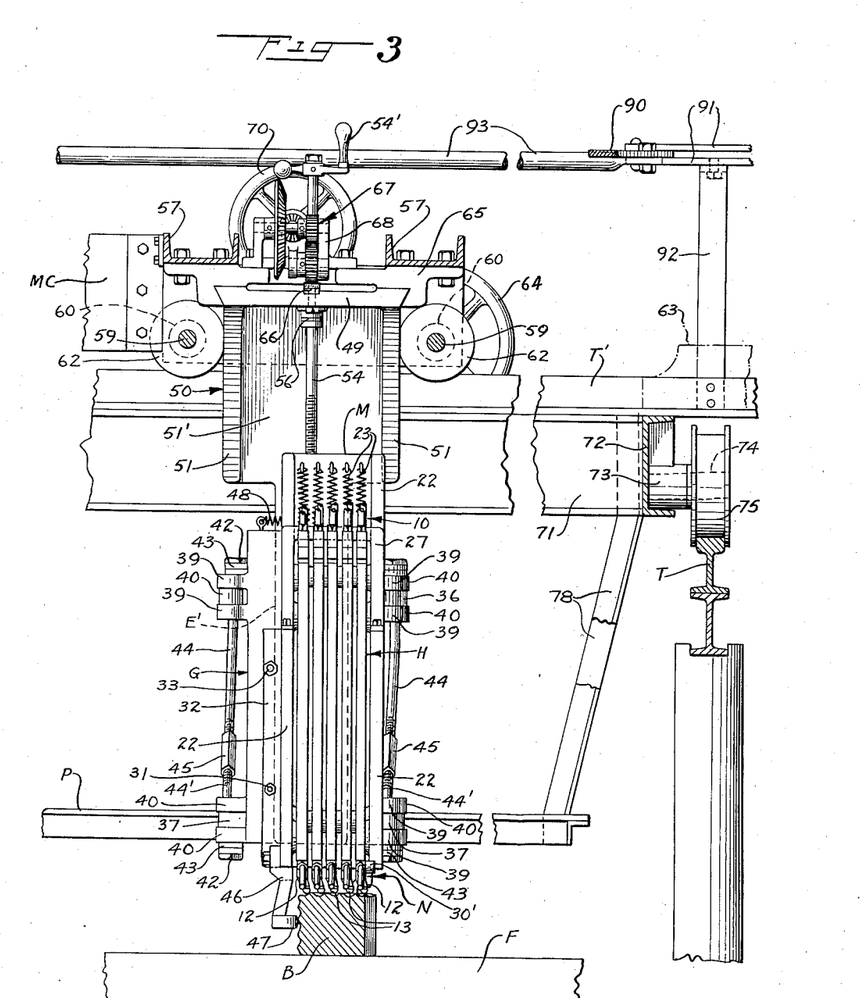
Fig. 3 is a view taken on line 3—3 of Fig. 1, enlarged to show the transversely movable carriage, the structure supported thereby, and the platform attached to the frame to permit the carrying of an operator during metal removing operations.
Figures 4, 5:
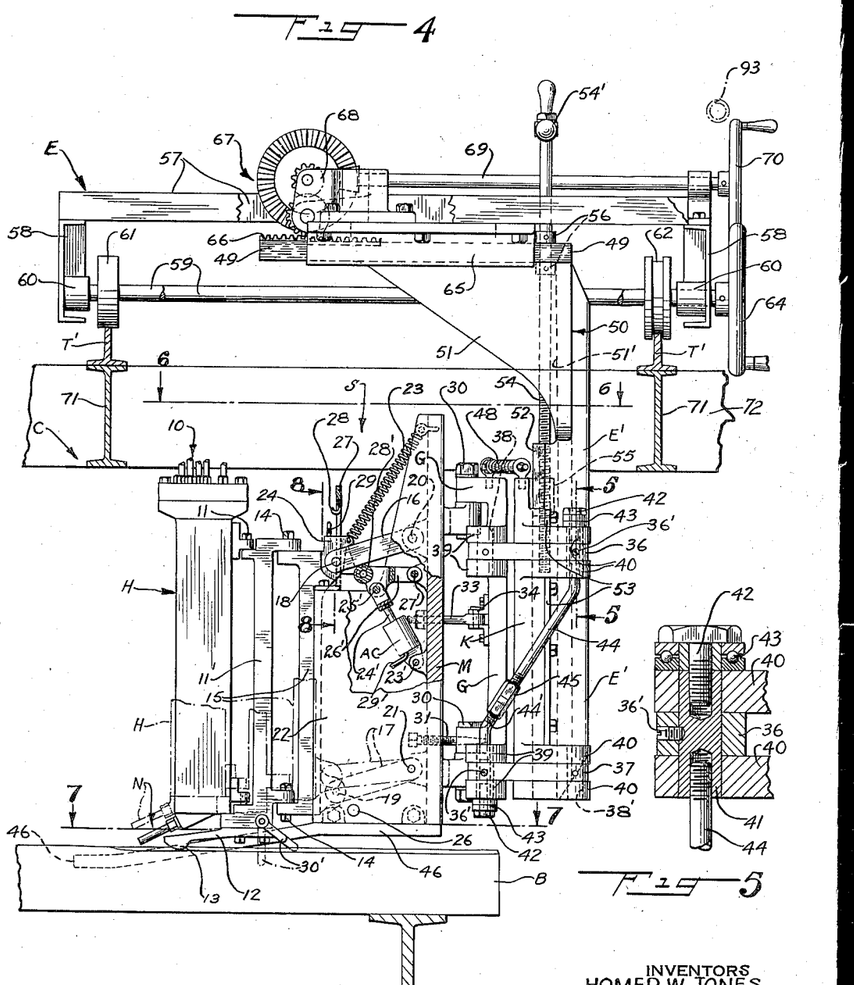
Fig. 4 is a view taken on line 4—4 of Fig. 1, on an enlarged scale, showing additional details of the structure supported by the transversely movable carriage.
Fig. 5 is a fragmentary sectional view taken on line 5—5 of Fig. 4, showing a detail of the structure supported by the transversely movable carriage.

Referring to Figs. 3 and 4, the blowpipe unit S may be supported on an arm member E' depending from the carriage E. The member E' comprises a horizontal plate 49 and a downwardly extending post 50 integral therewith. As shown in Fig. 6 the post 50 may be provided with a backing plate 51' formed integral therewith, which backing plate is provided with tongues or projections or vertical guides 52 adapted to contact the inner surfaces of the side walls and the bottom surface of the vertically extending frame member or slider K. Vertically extending plates 53 secured to the ends of the side walls of the member K and projecting over the tongues 52 provide a sliding engagement for the member K along the backing plate 51 and guides 52 of the post 50. To manually move the slide member K vertically and to maintain the same at any desired position, there is provided a threaded shaft or slow pitch screw 54 having a handle 54' at the upper end thereof, which shaft extends downward through an opening in the horizontal plate 49 and is adapted to engage in a threaded opening formed in a lug 55 which may be integral with the member K. Lengthwise movement of the shaft 54 is prevented by collars 56 fixed thereto and bearing against the upper and lower sides of the horizontal plate 49 so that, when the shaft 54 is turned by the handle 54', the member K and parts supported thereby will move vertically along the post 50.

Figure 1:
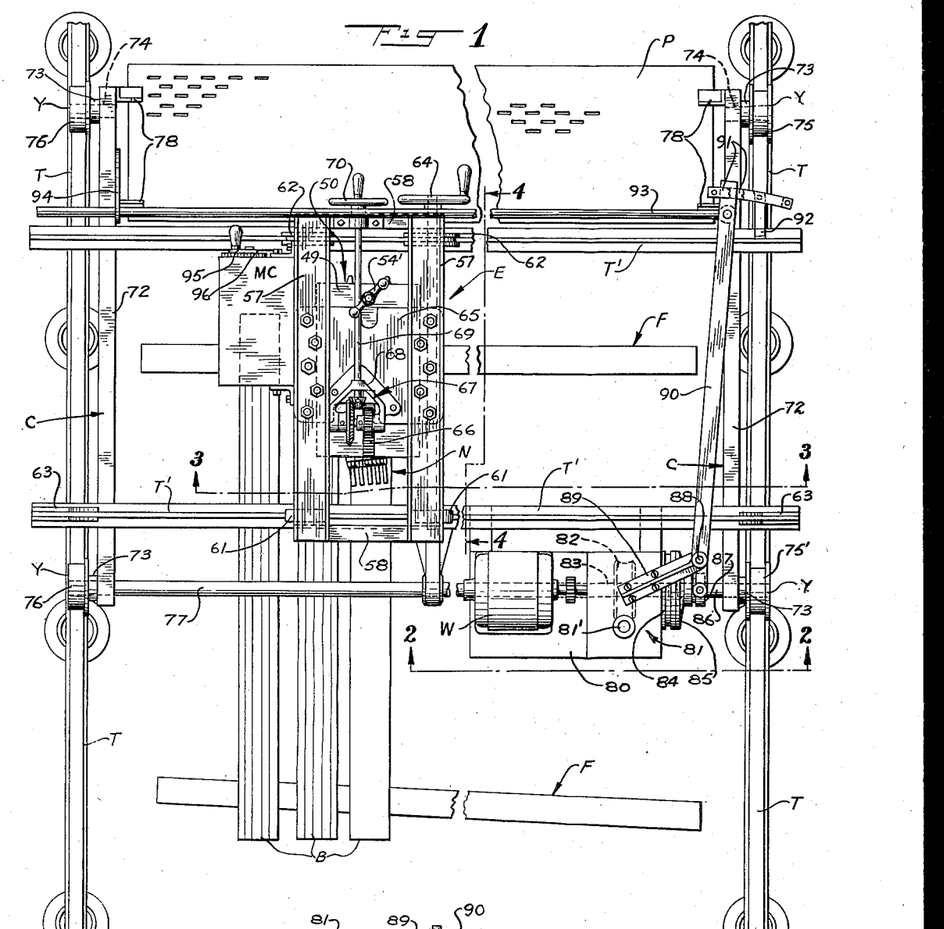
Fig. 1 is a plan view of an improved apparatus embodying the principles of this invention in which a carriage is transversely movable on a frame bodily movable on spaced rails.
Figure 2:
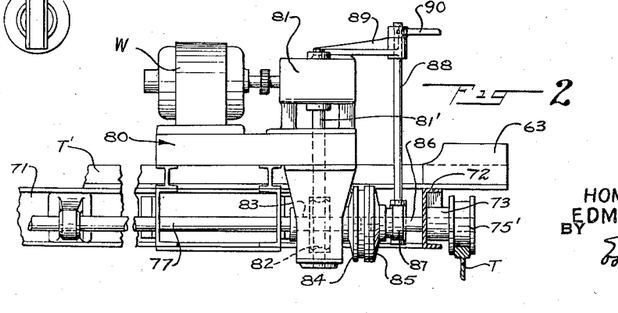
Fig. 2 is a sectional view taken on line 2—2 of Fig. 1, illustrating the motor and mechanism for driving the frame.

The carriage E from which the arm member E' depends may comprise two spaced channel members 57 having the ends thereof connected by vertically arranged channel members 58. Shafts 59 extending parallel to the channel members 57 are journaled in bearings 60 secured to the members 58, and to these shafts are secured rollers 61 and 62 movable along rails T'. It will be noted that the rollers 62 are grooved to guide the carriage E along the rails T', while the rollers 61 are flat and serve as rolling supports. Plates 63 may be attached to the ends of one of the rails T', as shown in Figs. 1 and 3, to limit the movement of the carriage E on the tracks. To move the carriage E along the rails T', a handwheel 64 is fixed to an end of one of the shafts 59 that extends outside a channel member 58. It will be seen that this movement of the carriage E provides an adjustment transverse to the direction of movement of the blowpipe unit S with respect to the work.

In addition to providing the vertical and transverse adjustments of the blowpipe unit S, which have been described, it is desirable to provide an adjustment in the normal longitudinal direction of movement of the nozzles N when surface metal is removed, so that the nozzles may be initially positioned at the end of a metallic body or at any other point to start a cut. This may be accomplished by securing to the channel members 57, intermediate the ends thereof, a face plate 65 arranged in dove-tailed engagement with the horizontal plate 49 of the depending member E'. The mechanism for imparting movement to the member E' relatively to the base plate 65 may comprise a toothed rack 66 attached to the upper surface of the plate 49, which toothed rack is adapted to engage a pinion extending through an opening in the plate 65 which forms part of gearing 67 mounted on a bracket 68 attached to the plate 65. A shaft 69 journaled on the carriage E and having a handwheel 70 at one end thereof adjacent the handwheel 64 is provided to drive the gearing 67 and move the member E' forward or backward in the direction of movement of the nozzles N.

The rails T' upon which the carriage E is movable are mounted upon spaced I-beams 71 which may form part of the frame C. The ends of these beams 71 may be connected by channel members 72 arranged at right angles to the beams 71, and to these channel members near the ends thereof are secured bearings 73. Stub shafts 74 having rollers 75 and 76, respectively, fixed thereto are journaled in the bearings 73 at one end of the channel members 72, and a shaft 77 having a length substantially the width of the carriage C and rollers 75' and 76' fixed thereto is journaled in the bearings 73 at the opposite ends of the channel members 72 and in a bearing 73' mounted on a bracket attached to one of the beams 71. The rollers are supported by and movable along spaced tracks T, the rollers 75 and 75' being double-flanged to guide the frame C and the rollers 76 and 76' being single-flanged, as shown in Fig. 1.

At the rear of the frame C and adjacent the rollers 75 and 76 is provided a platform P supported by angle members 78 attached to the channel members 72 and disposed in a horizontal plane above the top surface of the work. In order to permit an operator to stand on the platform P, the tracks T are elevated a substantial distance above the supporting plane of the work.

The frame C is preferably driven on the tracks T by a motor W supported on a base member 80 which is mounted at the forward end of the frame C. The motor W may, through suitable reduction gearing 81, drive a worm wheel 81' which engages a worm 82 fixed to a quill shaft 83. One element 84 of a clutch may be secured to the quill shaft 83 which is loosely mounted on the shaft 77 so as not to have any axial movement. The other cooperating clutch element 85 is secured to a quill shaft 86 which is splined to the shaft 77, and to this quill shaft 86 is attached a clutch collar 87 for moving the clutch element 85 toward and from the clutch element 84. The clutch operating mechanism may comprise a vertically extending rod 88 journaled in a bracket 89 attached to the housing of the reduction gearing 81, the lower end of which rod is provided with a yoke connected to the collar 87. A lever 90 disposed in a plane above the frame C and extending from the front to the rear thereof is connected at the forward end to the upper end of the rod 88. The opposite end of the lever 90 is adapted to slide in a guide comprising two spaced members 91 connected at their ends and supported by a vertical member 92 mounted on the frame C. Extending across the frame C in a horizontal plane above the hand-wheels 64 and 70 is arranged a clutch operating rod 93 pivotally connected at one end thereof to the lever 90 and slidable at the opposite end thereof in an opening formed at the upper end of a bracket 94 mounted on the frame C.

It will be readily seen from Figs. 1 and 3 that the handle 54' for the vertical adjustment of the blowpipe unit S, the handwheel 64 for the transverse adjustment of the carriage E and blowpipe unit S, the handwheel 70 for the limited longitudinal adjustment of the blowpipe unit S, and the clutch operating rod 93 for connecting the driving motor W to the shaft 77 are all within easy reach of the operator as he stands on the platform P. Hence all the movements and adjustments of the apparatus are under his full control as the frame C is propelled along the tracks T.

In addition, the motor control MC for the driving motor W may be mounted on the carriage E. The motor control MC may be provided with a handle 95 for reversing the direction of the motor W and for regulating the speed thereof in either direction. To drive the frame C on the tracks T at a predetermined rate of speed there is provided an indicating scale 96 cooperating with a pointer on the handle 95. This scale may be graduated in any suitable manner, and we preferably mark the scale to indicate the rate of frame travel in "feet per minute."

Figure 9:
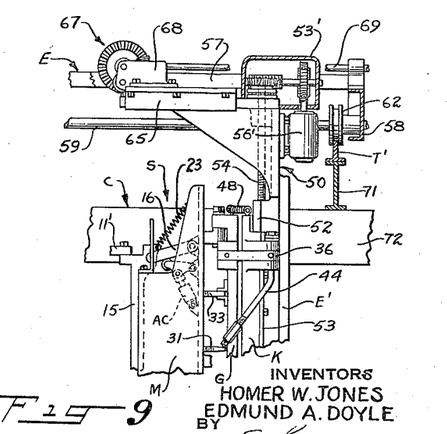
Fig. 9 is a view illustrating a modification of a portion of the transversely movable carriage supporting structure shown in Fig. 4.

In the embodiment of our invention which has been described, the vertical adjustment of the blowpipe unit S is effected by turning the handle 54' on top of the carriage E. In many cases this manual vertical adjustment is adequate since a further vertical adjustment of the nozzle heads H and nozzles N is attained through the air cylinder AC. In some cases, though, an automatic vertical adjustment of the entire blowpipe unit S is desirable. Such an automatic adjustment is illustrated in the embodiment shown in Fig. 9 where parts similar to those described in the first embodiment are indicated by the same reference numerals. In Fig. 9 automatic vertical adjustment of the blowpipe unit S is effected through a driving motor 56' mounted on the carriage E. The motor 56', through suitable gearing such as a train of worm-gearing enclosed in a housing 53', may be arranged to drive the vertical threaded shaft 54. The motor 56' may be provided with a suitable control for varying the speed and reversing the direction thereof. In this manner a rapid initial vertical adjustment of the blowpipe unit S can easily be made. The unit S will remain in adjustment because the gearing in housing 53' and the slow pitch of the threads of screw 54 constitute an irreversible gearing of such nature that the weight of the unit S cannot operate the gearing.

In order not to complicate the drawings more than necessary, only portions of the conduits for supplying the gases to the nozzle heads H have been shown at 10 in Fig. 4. Preferably these conduits are connected to oxidizing and combustible gas manifolds 10' mounted on the carriage E, the gas supplied to each conduit being controlled by a separate valve. Two main valves indicated at 104 and 105 in Fig. 10, for controlling the oxidizing gas and combustible gas supplied to these manifolds may be positioned near the platform P, so that they can readily be controlled by the operator. The conduits leading to the manifolds may be supported above the apparatus in any suitable manner and are of sufficient length to permit free movement of the frame C and carriage E. The control valve 101, shown in Fig. 10, for the air cylinder AC may be mounted on either the frame C or carriage E, within easy reach of the operator, and the cylinder AC connected through valve 99 and conduits 29' and 102 to a source of compressed air such as an air-storage receiver 103. Conductors supported in the same manner as the gas conduits may be connected to the motor control MC and motors W and 56'.

The operation of the apparatus illustrated in the drawings is substantially as follows: It will be asumed that the frame C is positioned on the tracks T so that the nozzles N are adjacent one end of the metallic body B; that the desired angular position of each nozzle N with respect to the direction of movement thereof is made at the pivotal connections 14 between the vertical members 11 and 15; that the vertically extending members 15 are disengaged from the hooks 28 so that the nozzles N are in an operative position; that the member M is positioned at the pivotal connections 30 by the threaded studs 31 and 33; that the operator is standing on the platform P; that the handle 54' has been turned or the motor 56' driven to adjust the nozzles N vertically with respect to the top surface of the metallic body B; that the nozzles N have been adjusted adjacent the end edge of the metallic body B by turning the handwheel 70; that the handle 30' of trigger valve 99 is in a vertical position whereby the air cylinder AC is effective to raise the nozzles N and shoes 12 upwardly so that they will be above and spaced from the metallic body; that the nozzles N have been correctly positioned laterally by moving the carriage E on the tracks T' by means of the handwheel 64, so that the shoe 47 of the arm 46 will contact a side surface of the metallic body B and the nozzles N are disposed between the lateral edges of the top surface of the body B; that the individual valves (not shown) for the conduits 10 supplying combustible and oxidizing gases to the nozzle heads H are opened; that the main combustible and oxidizing gas valves 105 and 104 respectively are closed; that the clutch operating rod 93 is in a clutch disengaging position; and that the driving motor W is energized to drive the frame C in a forward direction with the motor control handle 95 set for a predetermined rate of movement of the frame C.

With the above assumed conditions, the main valve 105 in the conduit which supplies combustible gas to the nozzle heads H is opened by the operator and the combustible gas issuing from the nozzles N is ignited. This may be accomplished electrically by a long conductive rod connected to a source of electrical energy and having an insulating handle which the operator may grasp. By contacting the surface of the grounded metallic body with the end of this rod at a point near the tips of the nozzles N, sufficient sparking is produced to ignite the combustible gas. This can readily be done by the operator while standing on the platform P.

As soon as the edge of the metallic body has reached an ignition temperature, the main oxygen valve 104 may be opened by the operator to supply oxidizing gas to the nozzle heads H, and the clutch operating rod 93 is moved in the proper direction so that the frame C will be driven by the motor W at the predetermined rate of speed at which the handle 95 is positioned.

When the cut is started and the blowpipe unit S has moved from the edge of the metallic body B, the handle 30' of the trigger valve 99 will be dragged over the top surface in its inclined position, as shown in Fig. 4. In this position the trigger valve 99 is effective to cause the compressed air within the air cylinder AC to discharge into the atmosphere through port 100, so that the nozzles N and shoes 12 will be lowered by gravity until the tips 13 contact the surface of the metallic body.

The oxidizing gas streams issuing from the orifices of the nozzles N will then oxidize the surface metal which has been raised to an ignition temperature by the heating flames, and this oxidized metal along with molten metal will be washed ahead of the nozzles N in the form of a slag by the force of the oxidizing gas streams.

Since the arm 46 is biased towards a side surface of the work by the tension spring 48, any irregularities in such surface will cause the arm 46 to move; and this movement will cause the nozzles N to move a corresponding distance laterally, through the parallel linkage, as they are moving with respect to the work. Due to this parallel linkage connection between members G and K, however, the nozzles N will always remain in their adjusted position during the entire time they are moving with respect to the work.

When the cut has been completed, the operator moves the clutch operating rod 93 in a direction to disengage the driving motor W from the shaft 77, and closes the main oxidizing and combustible gas valves. If surface metal is to be removed from a number of duplicate pieces of substantially the same size and shape, the operator remains standing on the platform P, reverses the direction of the driving motor W by moving the motor control handle 95 in the proper direction, and subsequently moves the clutch operating rod 93 so that the frame C will be driven back to its starting position. The handle 30' of the trigger valve 99 will again assume its vertical position when the nozzles N and shoes 12 move off the metallic body at the end of a cutting operation, and the air cylinder AC will raise the nozzles N and shoes 12 above the work. During the return movement of the frame C, the handle of the trigger valve will be dragged along the work surface in the opposite direction from that shown in Fig. 4, and in such an inclined position the piston rod 24' will remain in its upper position because valve 99 is then open to conduit 102. After the frame C reaches its starting position, the lateral or transverse and longitudinal adjustments can then be made to position the nozzles N adjacent the end of a second metallic body B, and the cutting operation repeated as described above.

Although it has been mentioned that the main oxidizing gas valve can be controlled manually by the operator, it may be desirable in certain instances to control this valve automatically. This is particularly true at the end of a metal removing operation when it is desired to shut off the supply of oxidizing gas as quickly as possible. This may be readily accomplished by rendering the trigger valve operative to close the main oxidizing gas valve when the handle 30' assumes a vertical position and the nozzles N are raised from the work after a cut is completed. To this end a diaphragm operated valve 98, shown in Fig. 10, may be interposed in the main gas conduit in series with valve 104 and connected by means of a branch conduit 129 to conduit 29' to receive the compressed air impulses delivered by valve 99.

When surface metal is to be removed from metallic bodies of different size and/or shape, the adjustments previously described can be readily effected for any type of cut desired. If it is necessary at any time to replace or repair a particular nozzle head H, this can be easily accomplished by removing the connections at 11 without affecting the position of the remaining nozzles H. Further, when cuts varying in width are made, it is only necessary to raise the particular nozzle heads H not needed and to maintain them in such raised position by the hooks 28 and cooperating eyebolts 29.

In the description of the operation of the apparatus, it has just been stated that the oxidizing gas streams blow oxidized and molten surface metal ahead of the nozzles. This mixture of oxidized and molten surface metal has been termed a "slag." Although the surface metal removed can be reduced completely to an oxidized form, it has been found in practice that a portion of the surface metal can be removed while in a partially oxidized state and in an unoxidized state and molten form, thus effecting considerable economy in the amount of oxidizing gas required to make cuts in the surface of metallic bodies.

The removed metal is in part completely oxidized and rises as a brown smoke, while another part in a molten state and incompletely oxidized is washed up ahead of the oxidizing stream in the form of a slag which does not adhere firmly to the metal surface from which metal is being removed. The new surface produced is characterized by a clean, smooth appearance and is traversed by contiguous grooves or channels having gradually sloping sides, as indicated in the section of the billet B shown in Fig. 3.

Satisfactory cuts have been made with the nozzles adjusted at acute angles varying from 10 to 35 degrees with respect to the work. When the nozzles are arranged at the higher angles, slightly wider cuts are obtained.

The width of the cuts can also be controlled to some extent by adjusting the nozzles at an angle to their line of travel. Such an arrangement of nozzles is shown in Figs. 1 and 6 with the nozzles N at an acute angle transversely to the direction of movement thereof. With the nozzles adjusted in this manner the slag is swept or forced sidewise from the cut and wider cuts are made. However, when wider cuts are made in this manner, some sacrifice must be made in the speed at which the cuts are produced. This is so because it has been found in practice that the slag ahead of the nozzles serves to aid in raising the successive surface portions to an ignition temperature; and when the slag is swept at a substantial transverse angle off the surface of the metallic body, the heating produced thereby is not utilized as effectively as when the slag is blown ahead of and substantially parallel to the travel of the nozzles.

In practice it has been determined that the best results under average conditions are obtained when the pressure of the oxidizing gas is adjusted to produce an oxidizing gas stream having a velocity between 550 and 750 feet per second. However, higher or lower oxidizing gas stream velocities may be employed to suit different conditions encountered in practice and the results desired. The gas velocities just mentioned are calculated velocities of the gas discharged from the nozzles based on the assumption that a measured volume of gas discharged in a given time has a temperature of 70° F. and is at atmospheric pressure.

The nozzles N are moved relatively fast over the surface of the metallic body B. In any particular case, in order to make cuts rapidly, the nozzles are preferably moved at the maximum speed which will still give a cut of the desired depth and width. By way of example, satisfactory cuts have been made on cold metal by moving nozzles at speeds varying from 4 to 90 feet per minute.

In view of the foregoing it will be apparent that we have provided an improved apparatus for producing cuts or removing surface metal from metallic bodies, the apparatus being extremely flexible and adaptable for any metal surfacing operation encountered in practice.

While we have shown and described a particular embodiment of our invention, it will be apparent that many modifications may be made, and that certain features can be used independently of others without departing from the spirit and scope of our invention as set forth in the claims.

We claim:

1. In apparatus for removing from metallic bodies surface metal which has been raised to an ignition temperature, the combination of means for delivering oxidizing gas to the surface to be removed from a metallic body and in the direction from which metal removal is to be effected; a carriage supporting said oxidizing gas delivering means; a frame upon which said carriage is mounted for movement independent of said metallic body; means attached to said frame for permitting an operator to be carried thereby; means for guiding said frame lengthwise of the metallic body; means mounted on said frame for propelling the same on said guiding means; and control means disposed on said frame accessible to said operator for controlling both said carriage movement and said propelling means.

2. In apparatus for removing surface metal from metallic bodies, the combination with a movable carriage operatively disposed with respect to such body and having a supporting member, of a head having a blowpipe nozzle arranged to produce an oxidizing gas stream directed at an acute angle to the surface of the metallic body and in the direction from which metal is to be removed; means for relatively moving said blowpipe nozzle and the metallic body; and an auxiliary member having a parallel linkage connecting the same to said supporting member and provided with means for pivotally securing said nozzle head thereto.

3. In apparatus for removing surface metal from metallic bodies such as steel billets and the like, the combination with means for holding such body in a position to be operated upon when at least a portion of said surface has been raised to the oxygen ignition temperature, of means including associated heads and nozzles for delivering oxidizing gas in a plurality of streams at low velocity in a direction having a major component extending in the direction in which the surface removing operation is to be effected and impinged at an acute angle to the plane of the operating direction, means for supporting said associated heads and nozzles in operating positions for delivering oxidizing gas upon the surface to be removed, means for effecting relative motion between said body and said supporting means whereby said associated heads and nozzles may be advanced in said operating direction to effect surface removal, surface contacting means associated with said nozzles adapted to ride on said body and to bear the weight of said nozzles, and means for counterbalancing at least a portion of said weight.

4. In apparatus for removing surface metal from metallic bodies such as steel billets and the like, the combination with means for holding such body in a position to be operated upon when at least a portion of said surface has been raised to the oxygen ignition temperature, of means including associated heads and nozzles for delivering oxidizing gas in a plurality of streams at low velocity in a direction having a major component extending in the direction in which the surface removing operation is to be effected and impinged at an acute angle to the plane of the operating direction, means for supporting said associated heads and nozzles in operating positions for delivering oxidizing gas upon the surface to be removed, means for effecting relative motion between said body and said supporting means whereby said associated heads and nozzles may be advanced in said operating direction to effect surface removal, and following means associated with said heads and nozzles and arranged to engage with a side of said body other than that of the surface being removed and connected to effect lateral motion of said associated nozzles and heads as a group in response to the contour of said side.

5. In apparatus for removing surface metal from metallic bodies such as steel billets and the like, the combination with means for holding such body in a position to be operated upon when at least a portion of said surface has been raised to the oxygen ignition temperature, of means including associated heads and nozzles for delivering oxidizing gas in a plurality of streams at low velocity in a direction having a major component extending in the direction in which the surface removing operation is to be effected and impinged at an acute angle to the plane of the operating direction, means for supporting said associated heads and nozzles in operating positions for delivering oxidizing gas upon the surface to be removed, means for effecting relative motion between said body and said supporting means whereby said associated heads and nozzles may be advanced in said operating direction to effect surface removal, means for independently adjusting each of said associated heads and nozzles in desired operating positions upon said supporting means, and means for adjusting said associated heads and nozzles as a single unit about an axis perpendicular to said operating plane whereby said streams of oxidizing gas impinge at a desired lateral angle to the operating direction.

6. In apparatus for removing surface metal from metallic bodies such as steel billets and the like, the combination with means for holding such body in a position to be operated upon when at least a portion of said surface has been raised to the oxygen ignition temperature, of means for delivering oxidizing gas at low velocity in a direction having a major component extending in the direction in which the surface removing operation is to be effected and impinged at an acute angle to the plane of the operating direction, means including a frame for supporting said gas delivering means in operative position with respect to the surface to be removed, means for propelling said frame in said operating direction at a desired speed for effecting a surface removing operation, control means for effecting limited lateral motion of said frame with respect to the body in a direction transverse of said operating direction, control means for effecting a limited transverse motion of said frame with respect to the body at right angles to said lateral motion, and control means independent of said propelling means for effecting limited motion of said frame in a direction parallel to said operating direction, whereby a desired initial operating position may be readily attained.

7. In apparatus for removing surface metal from metallic bodies such as steel billets and the like, the combination with means for holding such body in a position to be operated upon when at least a portion of said surface has been raised to the oxygen ignition temperature, of means for delivering oxidizing gas at low velocity in a direction having a major component extending in the direction in which the surface removing operation is to be effected and impinged at an acute angle to the plane of the operating direction, means including a frame for supporting said gas delivering means in operative position with respect to the surface to be removed, means for propelling said frame in said operating direction at a desired speed for effecting a surface removing operation, means associated with said gas delivering means for adjusting the direction of the gas delivering means about an axis perpendicular to said operating plane, control means for effecting limited lateral motion of said frame with respect to the body in a direction transverse to said operating direction, control means for effecting a limited transverse motion of said frame with respect to the body at right angles to said limited lateral motion, and control means independent of said propelling means for effecting limited motion of said frame in a direction parallel to said operating direction.

8. In apparatus for removing surface metal from metallic bodies such as steel billets and the like, the combination with means for holding such body in a position to be operated upon when at least a portion of said surface has been raised to the oxygen ignition temperature, of means for delivering oxidizing gas at low velocity in a direction having a major component extending in the direction in which the surface removing operation is to be effected and impinged at an acute angle to the plane of the operating direction, means including a frame for supporting said gas delivering means in operative position with respect to the surface to be removed, a movable carriage supporting said frame means and provided with propelling means whereby said gas delivering means may be moved in said operating direction to effect surface removal, a platform on said carriage for carrying an operator, control means for actuating said propelling means, control means for effecting limited lateral motion of said frame on said carriage transverse to said operating direction, control means for effecting a limited up and down motion of said frame on said carriage, and control means independent of said propelling means for effecting a limited motion of said frame on said carriage in a direction parallel to said operating direction; said several control means being arranged in readily accessible positions for an operator on said platform.

9. In apparatus for removing surface metal from metallic bodies such as steel billets and the like, the combination with means for holding such body in a position to be operated upon when at least a portion of said surface has been raised to the oxygen ignition temperature, of means including associated heads and nozzles for delivering oxidizing gas in a plurality of streams at low velocity in a direction having a major component extending in the direction in which the surface removing operation is to be effected and impinged at an acute angle to the plane of the operating direction, means including a frame for supporting said associated heads and nozzles in operating positions for delivering oxidizing gas upon the surface to be removed, a movable carriage supporting said frame and provided with propelling means whereby said associated heads and nozzles may be moved in said operating direction to effect surface removal, means for independently adjusting each of said associated heads and nozzles in desired operating positions upon said frame, means for adjusting said associated heads and nozzles as a single unit about an axis perpendicular to said operating plane whereby said streams of oxidizing gas impinge at a desired lateral angle to the operating direction, control means for effecting limited lateral motion of said frame upon said carriage transverse to said operating direction, control means for effecting a limited up and down motion of said frame upon said carriage, and control means independent of said propelling means for effecting a limited motion of said frame in a direction parallel to said operating direction.

10. In apparatus for removing surface metal from metallic bodies such as steel billets and the like, the combination with means for holding such body in a position to be operated upon when at least a portion of said surface has been raised to the oxygen ignition temperature, of means including associated heads and nozzles for delivering oxygen gas in a plurality of streams at low velocity in a direction having a major component extending in the direction in which the surface removing operation is to be effected and impinged at an acute angle to the plane of the operating direction, means including a frame having a member and a parallel linkage for pivotally attaching the latter to said frame, said member removably supporting said associated heads and nozzles in operating positions with respect to the surface to be operated upon and being capable of a limited parallel motion in planes perpendicular to said operating plane, a movable carriage supporting said frame and attached member and provided with propelling means whereby said associated heads and nozzles may be moved in said operating direction to effect surface removal, means for individually adjusting and securing each of said associated heads and nozzles upon said member, and means including an actuating follower associated with said member and arranged to follow a side of said body other than that from which the surface is being removed, said follower effecting a limited transverse motion of said member corresponding to the contour of said side.

11. In apparatus for removing surface metal from metallic bodies such as steel billets and the like, the combination with means for holding such body in a position to be operated upon when at least a portion of said surface has been raised to the oxygen ignition temperature, of means for delivering oxidizing gas at low velocity in a direction having a major component extending in the direction in which the surface removing operation is to be effected and impinged at an acute angle to the plane of the operating direction, means including a frame having a member and a parallel linkage for pivotally attaching the latter to said frame, said member removably supporting said oxidizing gas delivering means and capable of movement through said linkage toward and from said body in planes perpendicular to said operating plane, a movable carriage supporting said frame and attached member and provided with propelling means whereby said oxidizing gas delivering means may be moved in said operating direction to effect surface removal, surface contacting means asssociated with said oxidizing gas delivering means and adapted to bear the weight of same on said body when effecting surface removal, and means associated with said frame for limiting the movement of said member and oxidizing gas delivering means toward said body at the end of a surface removing operation.

12. In apparatus for removing surface metal from metallic bodies such as steel billets and the like, the combination with means for holding such body in a position to be operated upon when at least a portion of said surface has been raised to the oxygen ignition temperature, of means for delivering oxidizing gas at low velocity in a direction having a major component extending in the direction in which the surface removing operation is to be effected and impinged at an acute angle to the plane of the operating direction, means including a frame having a member and a parallel linkage for pivotally attaching the latter to said frame, said member removably supporting said oxidizing gas delivering means and capable of movement through said linkage toward and from said body in planes perpendicular to said operating plane, a movable carriage supporting said frame and attached member and provided with propelling means whereby said oxidizing gas delivering means may be moved in said operating direction to effect surface removal, surface contacting means associated with said oxidizing gas delivering means and adapted to bear the weight of same on said body when effecting surface removal, means associated with said frame for limiting the movement of said member in said perpendicular planes toward said body operative at the end of a surface removing operation, and power means for moving said member in said perpendicular planes away from said body.

13. In apparatus for removing surface metal from metallic bodies such as steel billets and the like, the combination with means for holding such body in a position to be operated upon when at least a portion of said surface has been raised to the oxygen ignition temperature, of means for delivering oxidizing gas at low velocity in a direction having a major component extending in the direction in which the surface removing operation is to be effected and impinged at an acute angle to the plane of the operating direction, means including a frame having a member and parallel linkage for pivotally attaching the latter to said frame, said member removably supporting said oxidizing gas delivering means and capable of movement through said linkage toward and from said body in planes perpendicular said operating plane, spring means connected under tension between said frame and said member for offsetting at least a portion of the weight of said member and the supported oxidizing gas delivering means, a movable carriage supporting said frame and attached member and provided with propelling means whereby said oxidizing gas delivering means may be moved in said operating direction to effect surface removal, and surface contacting means associated with said oxidizing gas delivering means guiding the movement of said member toward and from said body and adapted to bear the weight of same on said body when effecting surface removal.

14. In apparatus for removing surface metal from metallic bodies such as steel billets and the like, the combination with means for holding such body in a position to be operated upon when at least a portion of said surface has been raised to the oxygen ignition temperature, of means for delivering oxidizing gas at low velocity in a direction having a major component extending in the direction in which the surface removing operation is to be effected and impinged at an acute angle to the plane of the operating direction, means including a frame having a member and a parallel linkage for pivotally attaching the latter to said frame, said linkage including two sets of articulated links, one set securing said member to said frame so as to be free to move in parallel planes perpendicular to said operating plane toward and from said body, the other set similarly securing said member to said frame for movement in parallel planes crosswise of said body, spring means connected under tension for regulating the movement of said first set of links and of said member toward and from said body, a second spring means for controlling said second set of links and biasing said member in an initial position of its crosswise motion, a movable carriage supporting said frame and attached member and provided with propelling means whereby said oxidizing gas delivering means may be moved in said operating direction to effect surface removal, surface contacting means associated with said oxidizing gas delivering means guiding the movement of said member toward and from said body and adapted to bear the weight of same on said body when effecting surface removal, and following means associated with said member arranged to ride on a side of said body other than that of the surface being removed and guiding said crosswise movement in response to the contour of said side.

15. In apparatus for removing surface metal from metallic bodies such as steel billets and the like, the combination with means for holding such body in a position to be operated upon when at least a portion of said surface has been raised to the oxygen ignition temperature, of means for delivering oxidizing gas at low velocity in a direction having a major component extending in the direction in which the surface removing operation is to be effected and impinged at an acute angle to the plane of the operating direction, means including a frame for supporting said gas delivering means in operative position with respect to the surface to be removed, a movable carriage supporting said frame and provided with propelling means whereby said gas delivering means may be moved in said operating direction to effect surface removal, and control means for said propelling means carried by said frame and provided with controls for actuating said propelling means to effect movement of said carriage at a selected speed in said operating direction and to effect a return movement of said carriage at a speed greater than said selected speed.

16. In a machine for surfacing metal bodies, a base, means for causing relative movement of the base and the bodies to be surfaced, a support on the base, an arm extending from the support, a blowpipe unit carried by the arm and located over the bodies, and means including irreversible gearing for moving the blowpipe unit vertically to adjust its spacing from the bodies, said gearing comprising a slow pitch worm of such a nature that it is not operable by the load on the unit and said unit remains in any set position.

17. In a machine for surfacing metal bodies, a base, means for causing relative movement of the base and the bodies to be surfaced, a support on the base, an arm extending from the support, a torch-holder frame carried by the arm and located over the bodies, and manually operated means including irreversible gearing for moving the torch-holder frame vertically to adjust its spacing from the bodies, said gearing comprising a slow pitch screw of such a nature that it is not operable by the load on the frame and said frame remains in any set position.

18. In a machine for desurfacing bodies of ferrous metal, the combination with a base, of a frame, blowpipe nozzles carried by said frame, means on said base for supporting said frame over a body to be operated upon, and mechanism for moving said frame and nozzles with respect to the body, said mechanism including means constructed and arranged to move said frame quickly and with little mechanical advantage, and manually actuated gearing having great mechanical advantage for moving said frame slowly to accomplish the final accurate positioning of said frame and blowpipe nozzles with respect to said body.

19. Apparatus for removing metal from a surface of a metal body such as a billet, comprising the combination of a frame; a blowpipe nozzle arranged to deliver an oxidizing gas stream obliquely against and lengthwise of said surface; means for so supporting said nozzle on said frame that said nozzle is free to move toward and away from said surface; mechanism for relatively propelling said body and said frame with said nozzle thereon in a direction lengthwise of said surface; and means associated with said nozzle, and adapted to engage successive portions of said surface from which metal has already been removed, to maintain said nozzle at a substantially uniform relation to said surface during such relative propulsion.

20. Apparatus for removing metal from a surface of a metal body such as a billet, comprising the combination of a frame; a blowpipe nozzle arranged to deliver an oxidizing gas stream obliquely against and lengthwise of said surface; means for so mounting said nozzle on said frame that said nozzle is free to move transversely relatively to said surface; mechanism whereby said body and said frame carrying said nozzle are propelled, one relatively to the other, in a direction lengthwise of said surface; and means associated with said nozzle and adapted to engage another surface of said body during such relative propulsion to move said nozzle transversely of said surface responsively to variations in the straightness of said body throughout its length.

21. Apparatus for removing metal from a lateral surface of a metal body such as a billet, comprising the combination of a frame; a blowpipe nozzle arranged to deliver an oxdizing gas stream obliquely against and lengthwise of said surface; means for so supporting said nozzle on said frame that said nozzle is free to move toward and away from said surface and also transversely relatively to said surface; mechanism for relatively propelling said body and said frame with said nozzle thereon in a direction lengthwise of said surface; means associated with said nozzle and adapted to constantly engage said body to maintain said nozzle at a substantially uniform relation to said surface during such relative propulsion; and means associated with said nozzle and adapted to engage another lateral surface of said body during such propulsion to move said nozzle transversely of said surface responsively to variations in the straightness of said body throughout its length.

22. Apparatus for thermo-chemically removing metal from a surface of a metal body such as a steel billet, comprising the combination of a blowpipe having a nozzle for applying a stream of oxidizing gas obliquely against and lengthwise of said surface; a guide disposed substantially perpendicularly to said surface; means for relatively moving said guide and said body in a direction parallel to and lengthwise of said surface; a carrier for said blowpipe; means adjustably connecting said blowpipe to said carrier for holding said blowpipe nozzle positioned in such oblique stream-applying relation to said surface; and means whereby said carrier is connected to said guide providing adjustment of said carrier along said guide toward and away from said surface and free movement of said carrier and said blowpipe nozzle in a direction both transversely of said guide and transversely of said surface.

23. Apparatus for thermo-chemically removing metal from a surface of a metal body such as a steel billet, comprising the combination of a blowpipe having a nozzle for applying a stream of oxidizing gas obliquely against and lengthwise of said surface; a guide disposed perpendicularly to said surface; means for relatively moving said guide and said body in a direction parallel to said surface; a carrier for said blowpipe; means connecting said blowpipe to said carrier for holding said blowpipe nozzle positioned in such oblique stream-applying relation to said surface; and means whereby said carrier is connected to said guide by parallel links movable in planes parallel to said surface and providing lateral adjustment of said nozzle with respect to said surface.

24. Apparatus for thermo-chemically removing metal from a surface of a metal body such as a steel billet, comprising the combination of a blowpipe having a nozzle for applying a stream of oxidizing gas obliquely against and lengthwise of said surface; a guide disposed perpendicularly to said surface; means for relatively moving said guide and said body in a direction parallel to said surface; a carrier for said blowpipe; means connecting said blowpipe to said carrier for holding said blowpipe nozzle positioned in such oblique stream-applying relation to said surface; means whereby said carrier is connected to said guide for adjustment longitudinally along the latter; said connecting means comprising a member slidable along said guide, a plate connected to said carrier by connecting means providing angular adjustment of said carrier relatively to said plate about an axis parallel to said guide, and parallel link means connecting said slidable member to said plate for providing lateral movement of said nozzle with respect to said surface.

25. Apparatus for thermo-chemically removing metal from a surface of a metal body such as a steel billet, comprising the combination of a blowpipe for applying a stream of oxidizing gas obliquely against and lengthwise of said surface; and mechanism for supporting said blowpipe constructed and arranged to provide free movement of said blowpipe in planes transverse to the longitudinal axis of said body and both laterally of and toward and away from the surface thereof; said mechanism including means operable to move said blowpipe in response to variations in the level of said surface and straightness of said body for maintaining said blowpipe at a substantially constant distance above said surface and at a substantially uniform distance from a lateral edge of said surface, and said stream at a substantially uniform angular relation to the longitudinal axis of said body.

26. Apparatus for thermo-chemically removing metal from a surface of a metal body such as a steel billet, comprising the combination of a blowpipe carrier; a blowpipe; a supporting frame; means connecting said carrier to said frame for adjustment of said carrier toward and away from said surface; means for effecting relative movement between said carrier and said body for traversing said blowpipe lengthwise of said surface; and mechanism including parallel links connecting said blowpipe to said carrier and arranged to provide free movement of said blowpipe substantially in parallel planes transverse to the longitudinal axis of said body and both laterally of and toward and away from said surface; said mechanism also including means operable to shift said blowpipe in response to variations in the straightness of said body for maintaining said blowpipe at a substantially constant distance from said surface and at a substantially uniform distance from a lateral edge of said surface during said relative movement between said blowpipe and said body lengthwise thereof.

27. Apparatus for thermo-chemically removing metal from a surface of a metal body such as a rectangular steel billet, comprising the combination of a blowpipe for applying an oxidizing gas stream obliquely against and lengthwise of said surface; a guide disposed perpendicularly to said surface; a carrier for said blowpipe; means connecting said carrier to said guide for adjustment along said guide and for movement laterally with respect thereto in a direction transversely of said surface; a shoe secured to said carrier and adapted to bear against another surface portion of said body substantially perpendicular to the surface against which said stream is applied; and resilient means tending to urge said carrier transversely of said surface and operable to yieldingly press said shoe against said other surface portion.

28. The combination of a blowpipe; a vertically disposed support therefor; and means for connecting said blowpipe to said support, to permit vertical and horizontal movement of said blowpipe relatively to a work surface; said connecting means comprising an intermediate member, a group of substantially parallel spaced horizontally swingable links, each link being pivoted at its opposite ends between said support and said intermediate member, said group of links being arranged to carry said blowpipe in horizontally displaced parallel positions, and a second group of parallel vertically swingable links, each link of said second group being pivotally connected between said intermediate member and said blowpipe, said second group of links being arranged for carrying said blowpipe in vertically displaced successively parallel positions.

HOMER W. JONES.
EDMUND A. DOYLE.